United States Patent
Seeto et al.

[11] Patent Number: 6,125,975
[45] Date of Patent: Oct. 3, 2000

[54] SEALED ELECTROMAGNETIC BRAKE

[75] Inventors: Paul K. Seeto, Plainville; Kevin L. Maurice, Bristol; Stephen Nyquist, Simsbury, all of Conn.

[73] Assignee: Inertia Dynamics

[21] Appl. No.: 09/193,388

[22] Filed: Nov. 17, 1998

[51] Int. Cl.$^7$ ..................................................... B60T 13/04
[52] U.S. Cl. ......................................... 188/171; 188/72.3
[58] Field of Search .................................. 188/161, 163, 188/171, 72.3, 156, 158, 71.5; 310/77, 78, 93, 67 R, 75 R, 75 C, 92, 103; 192/12 D, 84.1, 84.5, 84.31, 84.6, 84.9, 84.91

[56] References Cited

U.S. PATENT DOCUMENTS

| | | | |
|---|---|---|---|
| 4,982,825 | 1/1991 | Sekella | 188/161 |
| 5,368,138 | 11/1994 | Kuivamaki | 188/171 |
| 5,796,192 | 8/1998 | Riepl | 188/171 |
| 5,915,507 | 6/1999 | Maurice et al. | 188/171 |

Primary Examiner—Douglas C. Butler
Attorney, Agent, or Firm—Cummings & Lockwood

[57] ABSTRACT

An electromagnetic disk brake is compact, self-sealing, self-contained, has relatively few components, and is relatively easy to fabricate and to install when compared to traditional electromagnetic disk brakes. Self-containment and self-sealing are achieved by providing a skirt on the field cup that extends over the remaining moving components of the brake and that is attached, preferably by a press-fit, to a reaction plate at the inner end of the brake. The need for stand-offs to set the air gap of the brake can be eliminated by suitable control of the press-fitting of the field cup onto the reaction plate. For electric motor braking applications, the reaction plate can form the endbell of the electric motor, thereby combining the endbell, mounting plate and reaction plate in a single plate. Simplicity and ease of assembly of a spring-applied brake are enhanced further by employing a single compression spring at the center of the brake rather than a plurality of peripherally-spaced springs. Finally, in applications in which the brake includes a manual release lever, the brake may incorporate an improved release lever anti-rattle arrangement.

20 Claims, 7 Drawing Sheets

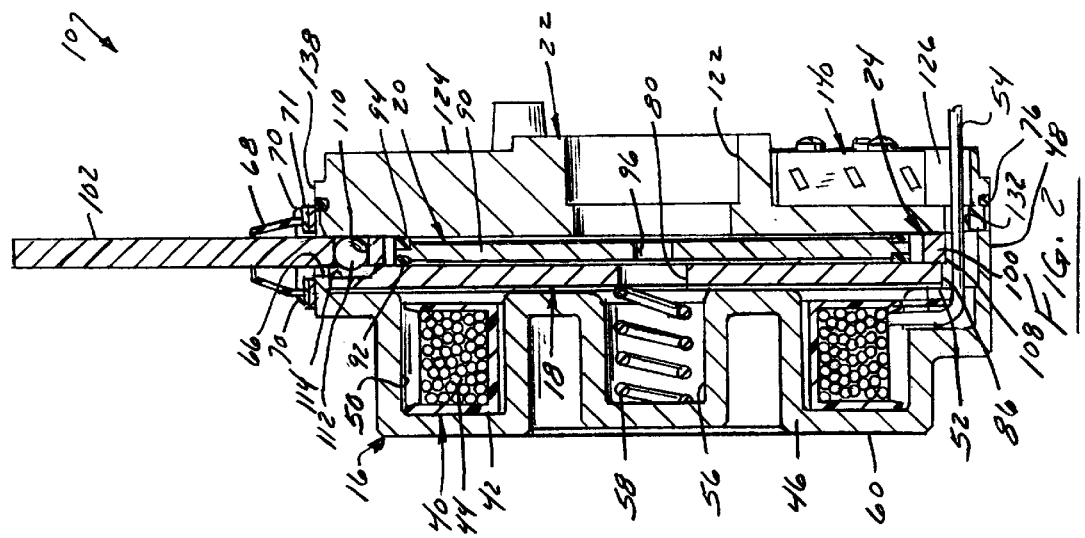

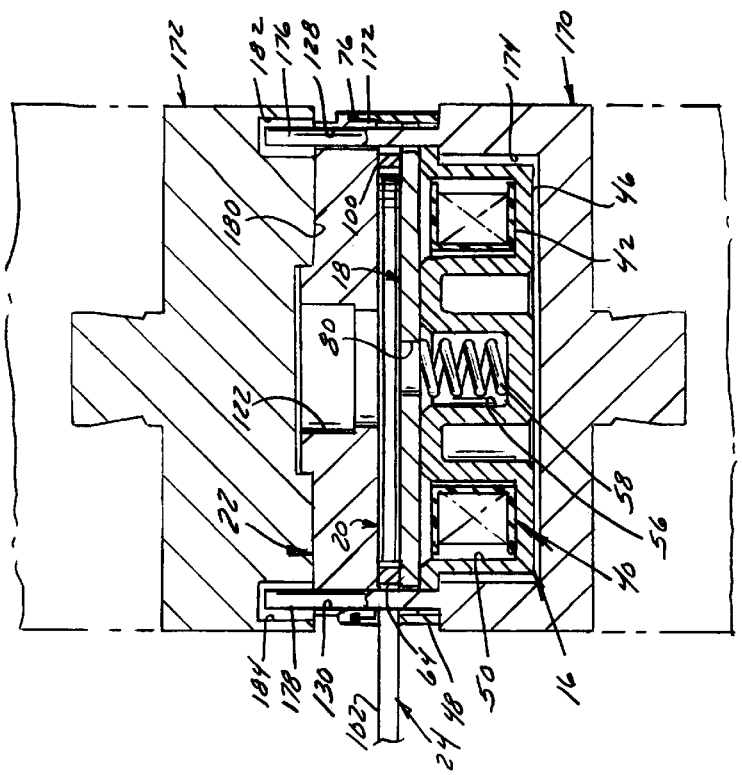
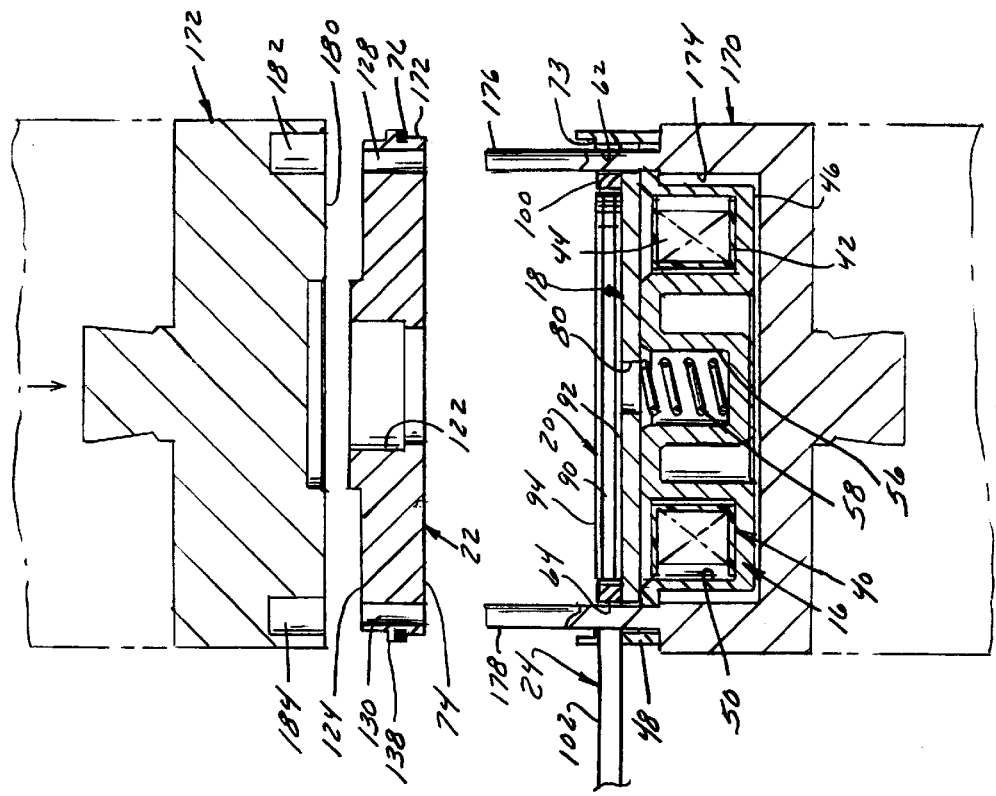

SEALED ELECTROMAGNETIC BRAKE

BACKGROUND OF THE INVENTION

1. Field of the Invention

The invention relates to disk brakes and, more particularly, relates to a self-sealing, self-contained electromagnetic disk brake. The invention additionally relates to a method of assembling a self-sealing, self-contained electromagnetic disk brake.

2. Discussion of the Related Art

Electromagnetic disk brakes are widely used in a variety of applications such as dynamic brakes for motor input shafts and/or output shafts and as static or "park-and-hold" brakes for motors and the like. A typical electromagnetic disk brake of this type includes a friction disk that is coupled with the shaft so as to be movable axially relative to the shaft but to be rotationally fixed relative to the shaft. In static braking applications, the brake is applied by compressing the friction disk between a stationary reaction plate and an axially-movable clapper plate to provide the desired holding action, and the brake is released by energizing the electromagnet to retract the clapper plate to allow the friction disk to rotate freely. In dynamic braking applications, the brake is applied while the shaft is rotating, either by energizing an electromagnetic actuator to overcome the force of a return spring or by de-energizing a normally-energized actuator to permit a compression spring to apply the brake.

Whether used in static braking applications or dynamic braking applications, the traditional electromagnetic disk brake exhibits characteristics increasing its cost and decreasing its versatility. For instance, it is usually necessary to encase the moving components of the brake in a separate cover to protect them from dust and other foreign matter. Covers suitable for these purposes usually are attached to the brake's field cup and/or mounting plate, and/or to the motor or other structure serviced by the brake. The need for this separate cover increases the cost of brake components as well as the cost of labor required to fabricate and assemble the brake. It also increases the overall size of the brake.

The complexity of the typical electromagnetic disk brake is increased further by the need for stand-offs in the brake to set the brake's air gap. Elimination of these stand-offs would significantly facilitate assembly and reduce the cost of labor and materials.

In the case of a spring-applied, electromagnetically released brake, the complexity of the brake is increased still further by the brake's spring actuator arrangement, which consists of a plurality (typically three) of compression springs spaced evenly around the periphery of the brake and mounted in spaced apertures in the inner surface of the field cup. Considerable expense is involved in forming these apertures.

Spring-applied, electromagnetically-released brakes having a manual release or manual override feature exhibit still another problem. Specifically, in brakes of this type, a manual release lever can be selectively rotated to force the brake's clapper plate away from the friction disk(s). These release levers typically have significant rotational play when the brake is actuated, leading to rattling and possibly to false actuation of indicator switches which are intended to be closed only upon manual brake release. Prior anti-rattle mechanisms for this type of brake have ranged from complex at best to ineffective at worst.

Electromagnetic disk brakes designed specifically for use with electric motors exhibit still another disadvantage. Specifically, brakes of this type include a mounting plate for attaching the brake to the motor's endbell. This mounting plate necessarily increases the size and weight of the brake, limiting the brake's usefulness in some applications. Attachment of the brake to the motor endbell also requires modification of the existing endbell structure to accept the mounting plate. It also tends to be relatively labor intensive.

The need has therefore arisen to provide an electromagnetic disk brake that has a minimum number of parts to reduce cost and weight, that is easy to fabricate by the brake manufacturer, and that is easy to install by the brake purchaser.

OBJECTS AND SUMMARY OF THE INVENTION

It is therefore a principal object of the invention to provide an electromagnetic disk brake that has fewer parts and that is easier to assemble than traditional electromagnetic disk brakes.

Another object of the invention is to provide an electromagnetic disk brake that meets the first principal object and that is self-sealing.

Another object of the invention is to provide an electromagnetic disk brake that meets the first principal object and that is self-contained.

In accordance with one aspect of the invention, these objects are achieved by providing a brake including a friction disk, a stationary reaction plate, a clapper plate, and a field assembly. The friction disk (1) is attachable to the shaft so as to rotate about the axis of rotation of the shaft and to move axially relative to the axis of rotation of the shaft and (2) has first and second axially opposed friction surfaces. The reaction plate is axially aligned with the friction disk. The clapper plate (1) is fixed from rotation with respect to the axis, and (2) is movable axially between (a) a first, unactuated position in which the brake is not applied and (b) a second, actuated position in which the friction disk is clamped between the clapper plate and the reaction plate to apply the brake. The field cup assembly includes (1) a coil which is selectively energizeable to drive the clapper plate to move from one of the first and second positions to the other of the first and second positions, and (2) a field cup including (a) an axially-outer body which houses the coil, and (b) a skirt which extends from the body, over the clapper plate and the friction disk, and to the reaction plate. The skirt is attached to the reaction plate so as to encase the clapper plate, the friction disk, and at least an inner axial surface of the reaction plate.

Preferably, the skirt is press-fit onto the reaction plate by an amount permitting the elimination of stand-offs that would otherwise be required to set an air gap of the brake.

Still another object of the invention is to provide an electromagnetic disk brake that meets the first principal object, that incorporates a manual release lever, and that has an improved anti-rattle arrangement for the manual release lever.

In accordance with yet another aspect of the invention, this object is achieved by providing a brake that includes a release disk and a roll pin which is affixed to the release disk and which extends axially through the reaction plate. An anti-rattle spring is mounted on the inner axial surface of the reaction plate and engages the roll pin so as to resist rotation of the manual release lever. The anti-rattle spring preferably comprises a spring wire having a first end affixed to the reaction plate, a free second end, and a knee separating the first and second ends to divide the spring wire into an inner end portion and an outer end portion. With this arrangement, upon manual release lever actuation, the roll pin rides along the inner end portion, over the knee, and then down the outer end portion.

A second principal object of the invention is to provide an electromagnetic disk brake for an electric motor that includes the motor's endbell as part of the brake.

Still another object of the invention is to provide an electromagnetic brake that meets the second principal object and that is easier to mount on the motor than traditional electromagnetic brakes.

In accordance with another aspect of the invention, this object is achieved by providing an electromagnetic disk brake which has at least some of attributes of a brake constructed in accordance with the first aspect and in which the reaction plate comprises an electric motor endbell. The brake, including the endbell, can be attached to a motor using bolts which extend through the field cup and the endbell and which are configured to attach the endbell to an electric motor.

Still another principal object of the invention is provide an improved method of assembling an electromagnetic disk brake.

In accordance with another aspect of the invention, this object is achieved by providing a brake that has at least some of the attributes of a brake constructed in accordance with the first aspect of the invention. The brake is assembled by aligning mounting holes in the field cup with mounting holes in the endbell and then press-fitting the skirt onto the endbell so as to encase the clapper plate, the friction disk, and at least an inner axial surface of the endbell in the skirt. Preferably, the aligning and press-fitting steps comprise locating the field cup assembly in a first portion of a press fixture having a plurality of posts that extend through the holes in the field cup, placing the clapper plate and the friction disk on the field cup, sliding the holes in the endbell over the posts, and driving a second portion of the press fixture toward the first portion so as to press the skirt onto the reaction plate.

The method preferably additionally comprises, following the pressing step, aligning a non-circular shaft mounting hole in the friction disk with the holes in the field cup assembly and the endbell by pressing the brake onto a fixture assembly having (1) spaced posts aligned with the holes in the field cup assembly and the endbell, and (2) an axially-central post having a non-circular shape when viewed in transverse cross-section.

These and other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawing in which like reference numerals represent like parts throughout, and in which:

FIG. 1 is an outer end view of an electromagnetic disk brake constructed in accordance with a preferred embodiment of the invention;

FIG. 2 is a sectional side elevation view taken generally along the lines 2—2 in FIG. 1 and illustrating the brake in its applied position;

FIGS. 7 and 8 are sectional side elevation views illustrating the assembly of the brake of FIGS. 1–6 by pressing an endbell of the brake onto a skirt of the brake's field cup.

DETAILED DESCRIPTION OF THE PREFERRED EMBODIMENT

1. Resume

Pursuant to the invention, an electromagnetic disk brake is compact, self-sealing, self-contained, has relatively few components, and is relatively easy to fabricate and to install when compared to traditional electromagnetic disk brakes. Self-containment and self-sealing are achieved by providing a skirt on the field cup that extends over the remaining moving components of the brake and that is attached, preferably by a press-fit, to a reaction plate at the inner end of the brake. The need for stand-offs to set the air gap of the brake can be eliminated by suitable control of the press-fitting of the field cup onto the reaction plate. For electric motor braking applications, the reaction plate can form the endbell of the electric motor, thereby combining the endbell, mounting plate and reaction plate in a single plate. Simplicity and ease of assembly of a spring-applied brake are enhanced further by employing a single compression spring at the center of the brake rather than a plurality of peripherally-spaced springs. Finally, in applications in which the brake includes a manual release lever, the brake may incorporate an improved release lever anti-rattle arrangement.

2. Construction of Electromagnetic Brake

Figure 3:
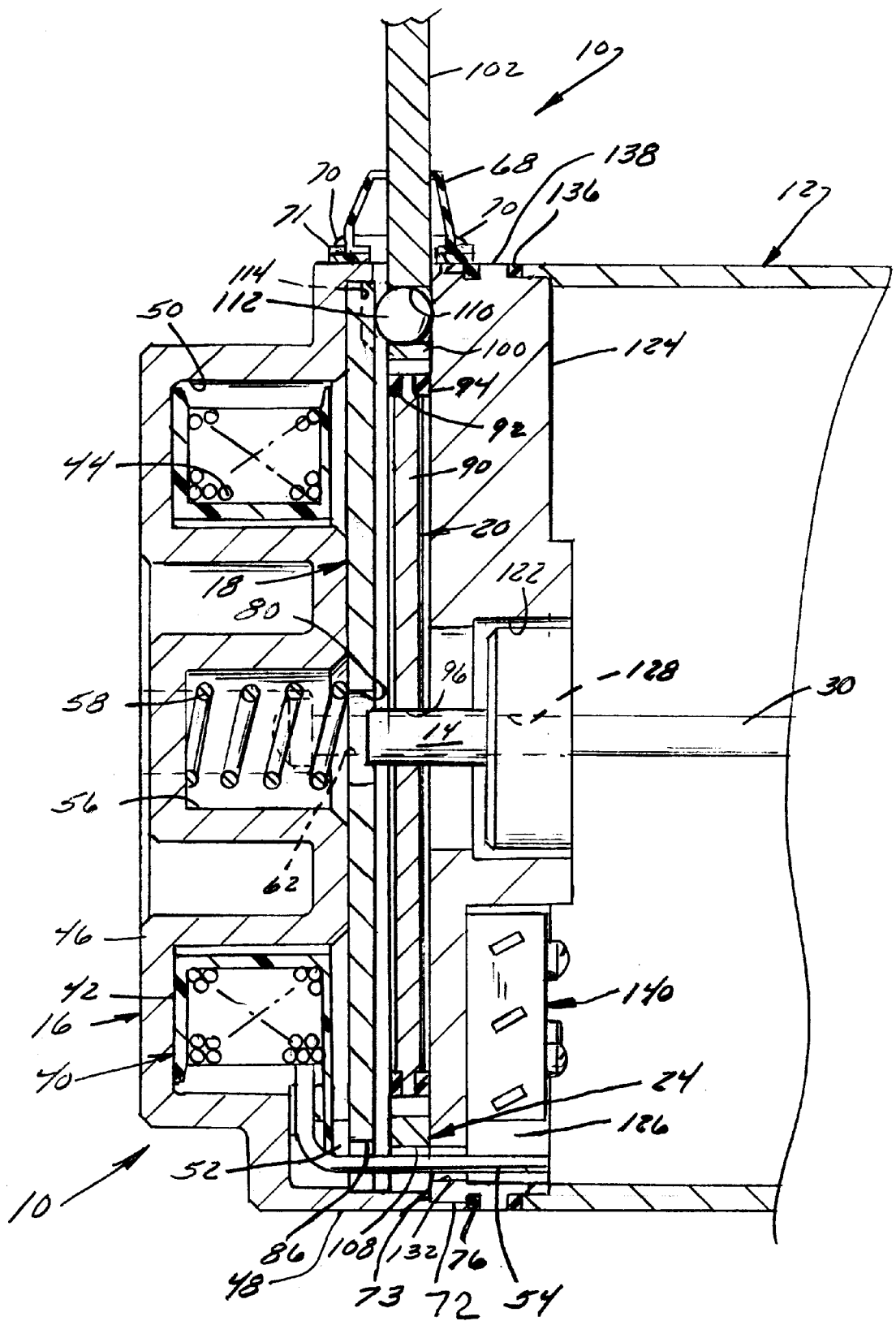
FIG. 3 generally corresponds to FIG. 2 but illustrates the brake in its released position.

Proceeding from left to right or from outer to inner ends in FIGS. 2 and 3, a brake 10 constructed in accordance with a preferred embodiment of the invention includes as its principal components a field assembly 16, a clapper plate 18, a friction disk 20, and a reaction plate 22. The illustrated brake 20 is of the manually-releasable type and, accordingly, additionally includes a manual release lever 24. It is to be understood, however, that at least most aspects of the invention are equally applicable to brakes lacking a manual release capability.

The brake 10 includes only a single friction disk 20. However, it should be understood that the invention is also applicable to brakes having multiple interleaved friction disks. In brakes of this type, all of the friction disks are axially movable with respect to a braked shaft. In this case, one or both friction surfaces of each friction disk would contact an axially movable, rotationally fixed separator plate rather than the clapper plate 18 or the reaction plate 22. However, the clapper plate 18 and reaction plate 22 would still be at least indirectly responsible for applying pressure to all of the friction disks.

While the invention applies to brakes capable of statically or dynamically braking virtually any shaft, the illustrated brake 10 is configured as a park-and-hold brake for a shaft 14 of a motor 12. The motor 12 may, for instance, comprise an AC electric motor having a dynamic brake (not shown) that is separate from the brake 10. It has been realized that size, weight, and the number of parts can be reduced and that brake assembly and brake installation can be simplified by forming the pressure plate and the endbell of the associated electric motor 12 as one integrated element. This arrangement not only eliminates the need for a separate reaction plate and endbell, but also eliminates the need for a mounting plate and associated hardware for mounting the reaction plate on the endbell. The entire brake 10 therefore can be mounted on the motor 12 using a pair of bolts 30 and 32 that extend through brake 10, through at least part of the motor 12, and into tapped bores (not shown) which are located within the motor 12 and which are designed to receive the mounting bolts for the stock endbell. Hence, while the element 22 will usually be referred to as an "endbell" because it combines the functions of a reaction plate and an endbell, it is to be understood that the brake 10 could be used in applications other than electric motors and that the invention applies to brakes having separate reaction plates and endbells.

In the illustrated embodiment, the field assembly 16 includes a field cup 40, a bobbin 42, and an electromagnetic coil 44. The field cup 40 includes a body 46 and a skirt 48 formed integrally with one another by stamping, spinning, or even molding steel or another ferromagnetic material. The coil 44 is housed in the bobbin 42 which, in turn, is housed in a relatively deep annular groove 50 formed in the inner axial face of the body 46. The bobbin 42 includes a guide tab 52 that directs lead wires 54 from the coil 44 axially inwardly through the remainder of the brake 10. This arrangement permits the lead wires 54 to be fed through the brake 10 and to the motor's source of electricity (not shown) without exposing them to the environment. Safety and seal integrity are enhanced. In addition, a deep recess 56 is formed in the center of the inner axial face of the body 46 for receiving a compression spring 58 that applies the brake 10 in the absence of coil energization or manual release. Significantly, the spring 58 is the only actuator spring for the brake 10. Its strength is commensurate with the combined strength of the multiple compression springs found in a similarly-sized traditional brake.

The field cup 40 also doubles as a housing that encases the moving components of the brake 10 and that seals the brake 10 sufficiently to keep dust and debris out of it. Hence, 1) an outer axial wall 60 of the body 46 is sealed, except for holes 62 and 64 formed therein for the passage of the mounting bolts 30 and 32 (even the holes 62 and 64 are sealed by seal rings 34 and 36 after the brake is attached to the motor 12), and 2) the skirt 48 extends axially inwardly from an inner axial end of the body 46 so as to encase the moving components of the brake 10. In the illustrated embodiment, in which the brake 10 includes a manual release lever 24, an arcuate aperture 66 is formed in the skirt 48 to permit the passage of a handle 102 of the release lever 24. This aperture 66 is sealed via a suitable rubber or other elastomeric boot 68 through which the handle 102 passes and which is affixed to the skirt 48 by mounting screws 70 and a retainer plate 71.

The skirt 48 is attached to the endbell 22, preferably by way of press fitting a stepped end 73 on the skirt 48 onto a complementary step 72 formed in the outer radial periphery of an outer surface 74 of the endbell 22. The skirt 48 is sealed to this step 72, preferably either by an O-ring (not shown) disposed radially between the skirt 48 and the radial periphery of the step 72 or by a gasket 76 disposed axially between the inner axial end of the skirt 48 and an axial edge surface of the step 72. A preferred technique for press-fitting the endbell 22 on the skirt 48 is detailed in Section 4, below.

Figure 4:
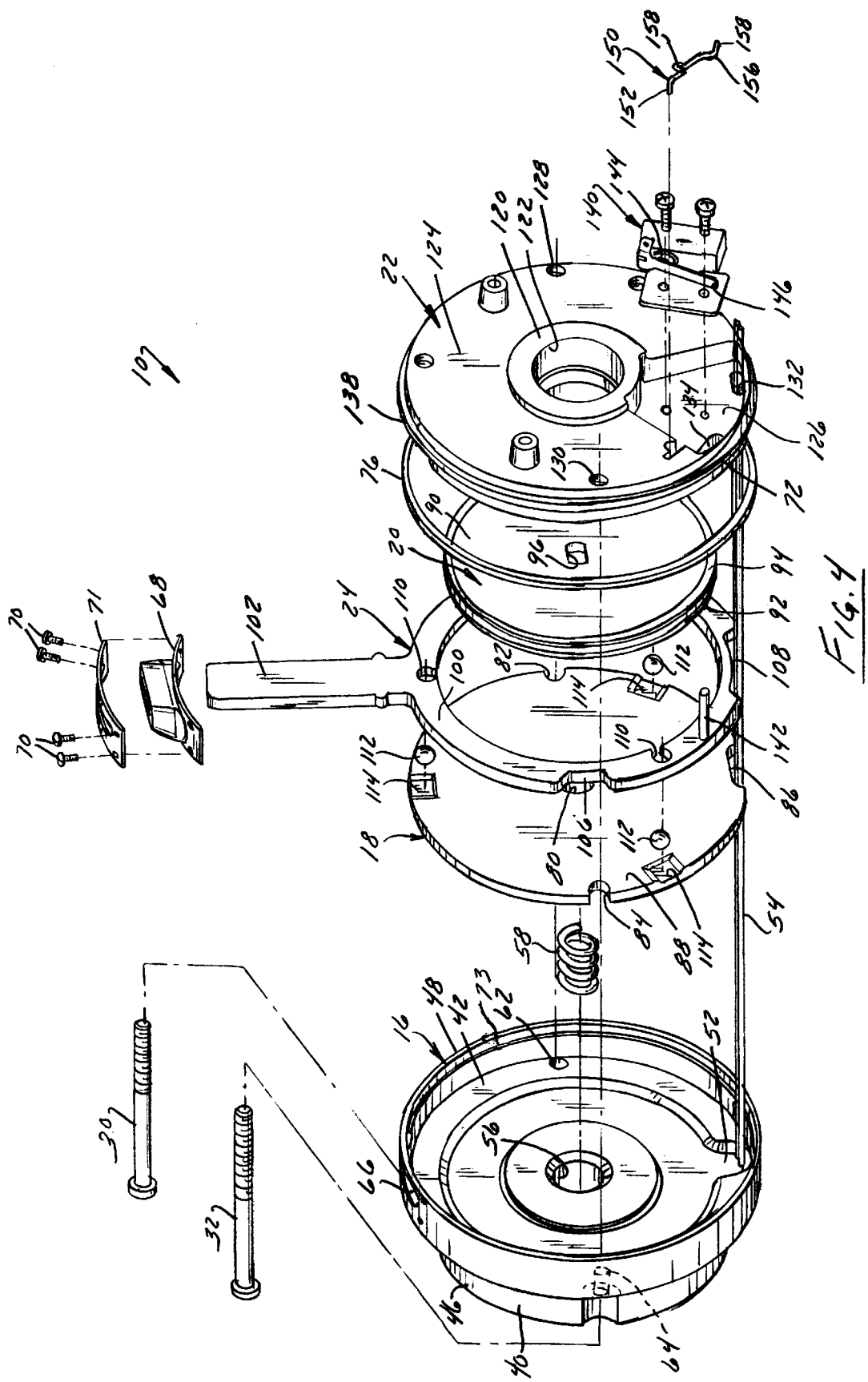
FIG. 4 is an exploded perspective view of the brake of FIGS. 1–3.

The clapper plate 18 comprises an annular plate made from a ferromagnetic material such a low carbon steel. It is rotationally fixed but is movable axially, through an air gap, between 1) a brake applied position in which it compresses the friction disk 20 between it and the endbell 22 and 2) a brake released position in which it abuts the field cup 40. The clapper plate 18 has a central aperture 80 formed therethrough for passage of the shaft 14. In addition, and as best seen in FIG. 4, two equally-spaced scallops 82 and 84 are formed in the outer peripheral surface of the clapper plate 18 for passage of the bolts 30 and 32 to prevent clapper plate rotation, and a third, enlarged scallop 86 is formed between the scallops 82 and 84 for the passage of the lead wires 54 for the coil 44. It should be apparent that standoffs, normally disposed in the scallops 82 and 84 to set the air gap of the brake 10 and to prevent clapper plate rotation, are not required. This is because the air gap of the brake 10 can be set by suitable control of the stroke through which the skirt 48 is press-fit onto the step 72 of the endbell 22. Specifically, the step 73 on the field cup 40 acts as a positive step when it engages the outer axial surface 74 of the endbell 22.

Referring to FIGS. 2–4, the friction disk 20 includes 1) a rigid backing plate 90 and 2) inner and outer friction rings 92 and 94. The backing plate 90, which is formed from a relatively rigid material such as aluminum, is mounted on the shaft 14 so as to be slidable axially with respect to the shaft 14 but so as to be rotationally fixed with respect to the shaft 14. The backing plate 90 also is preferably hubless in order to reduce the number of parts and to facilitate assembly. Towards these ends, a bore 96 is formed axially through the center of the backing plate 90 and has a noncircular (preferably a "double-D") shape complementing the shape of a mating portion of the shaft 14. The friction disks 92 and 94 could be made of any suitable material, but preferably are made of rubber as described in the commonly-assigned and co-pending application Ser. No. 09/167,006, filed Sep. 9, 1998 in the name of Kevin Maurice, the subject matter of which is hereby incorporated by reference in its entirety by way of background information.

Referring to FIGS. 2–6, the manual release lever 24 is optional to the brake 10. Accordingly, it will not be described in great detail. Suffice it to say that the release lever 24 includes a disk 100 and a handle 102. The handle 102 extends radially from the disk 100, through the aperture 66 in the skirt 48, and through and beyond the boot 68. The handle 102 of the release lever 24 is symmetrical with respect to its mounting screws 70 to allow the brake 10 to be configured for either left-hand operation or right-hand operation. The disk 100 is disposed radially outwardly of the friction disk 20 and axially between the inner axial surface 88 of the clapper plate 18 and the outer axial surface 74 of the endbell 22. First and second scallops 104 and 106 are formed in the outer periphery of the disk 100 for passage of the bolts 30 and 32, and a third scallop 108 is formed between the first and second scallops 104 and 106 for the passage of the lead wires 54. A plurality (three in the illustrated embodiment) of equally-spaced holes 110 are formed in the disk 100 for receipt of balls 112. The balls 112 rest in detents 114 in an inner axial surface 88 of the clapper plate 18 when the brake 10 is applied by the spring 58 or released by the coil 44. In a manual release operation in which an operator moves the handle 102 to rotate the disk 100 relative to the clapper plate 18, the balls 112 ride up the radial peripheral edge surfaces of the detents 114 to force the clapper plate 18 away from the friction disk 20 and the endbell 22, thereby releasing the brake 10. A manual release lever of this type is disclosed in U.S. patent application Ser. No. 08/932,904, filed Sep. 17, 1997 in the name of Kevin Maurice, the subject matter of which is hereby incorporated by reference in its entirety by way of background information.

The endbell 22 preferably performs any or all of three functions. For instance, as discussed above, its outer axial surface 74 functions as the reaction plate of the brake 10. Moreover, it presents a step 72 for press-fit attachment to the skirt 48 of the field cup 40, thereby permitting the brake 10 to be self-contained and self-sealing. Additionally, its inner axial surface is configured to be attached to the end of an associated electric motor 12 and to cover the openings in that end of the motor 12.

Toward these ends, and referring to FIGS. 2–6, the endbell 22 comprises a metal (preferably cast aluminum) disk. The disk has 1) an integral center hub 120 surrounding an aperture 122 for the passage of the shaft 14 of the motor 12, 2) an inner axial surface 124, and 3) the above-described outer axial surface 74. The outer axial surface 74 is stepped as discussed above to receive the skirt 48 of the field cup 40. At least a portion of the remainder of the outer axial surface 74 is machined sufficiently to permit it to act as a reaction plate when contacted by the friction ring 94 of the friction disk 20. The inner axial surface 124 is configured to cover the end of the electric motor 12 with a gasket 136 being disposed between the end of the motor 12 and a flange 138 of the endbell 22 as best seen in FIG. 3. In addition, a recess 126 is formed in the inner axial surface 124 for receiving a manual release indicator switch 140 as discussed in more detail below. First and second diametrically opposed axial holes 128, 130 are formed through the endbell 22 for passage of the mounting bolts 30 and 32 that connect the brake 10 to the motor 12. A third hole 132 is formed axially through the endbell 22 for passage of the lead wires 54, and an arcuate slot 134 is formed axially through the endbell 22 for passage of a roll pin 142 which will now be discussed in conjunction with the switch 140.

Figure 5:
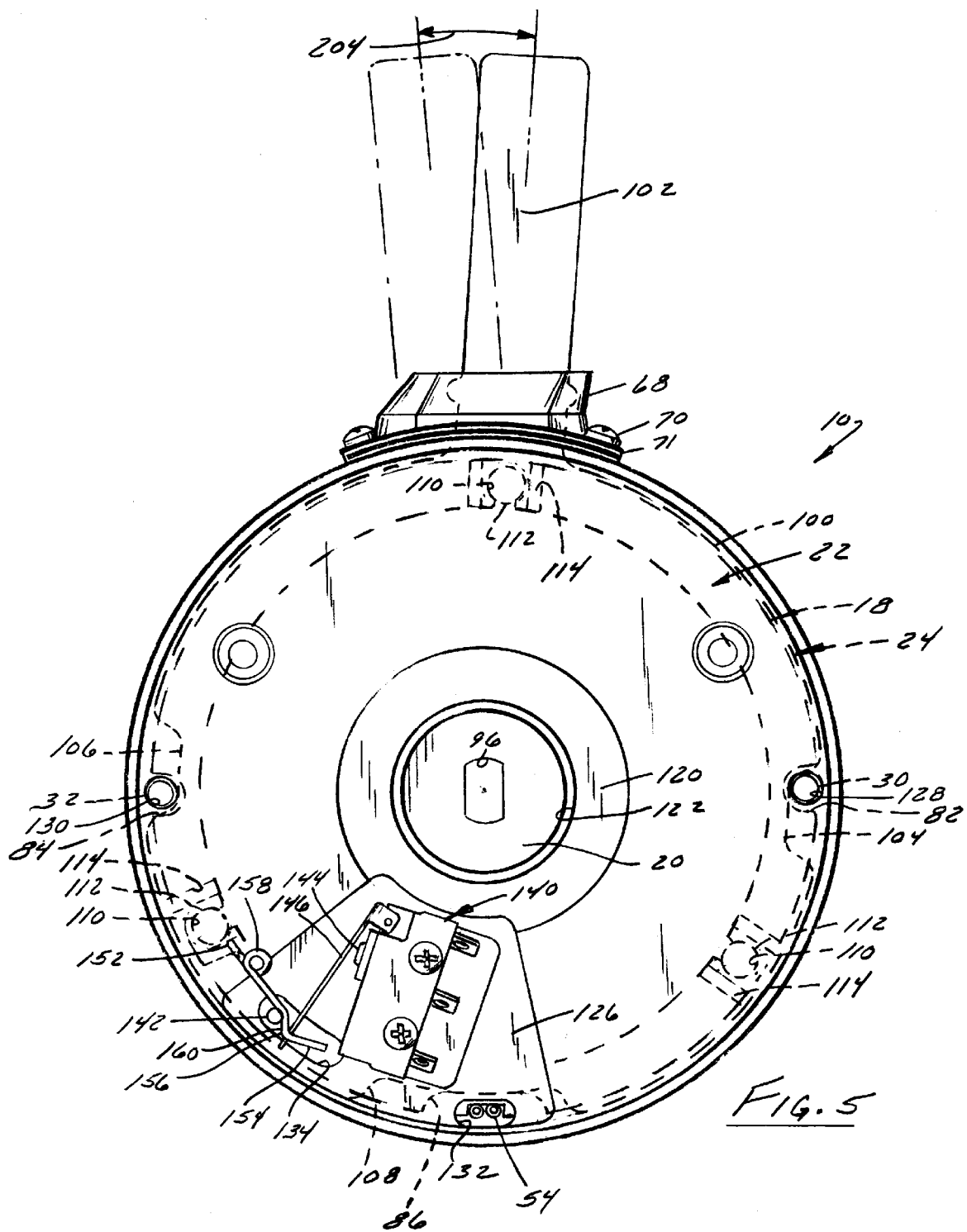
FIG. 5 is an inner end view of the brake of FIGS. 1–4, illustrating the brake in its applied position.
Figure 6:
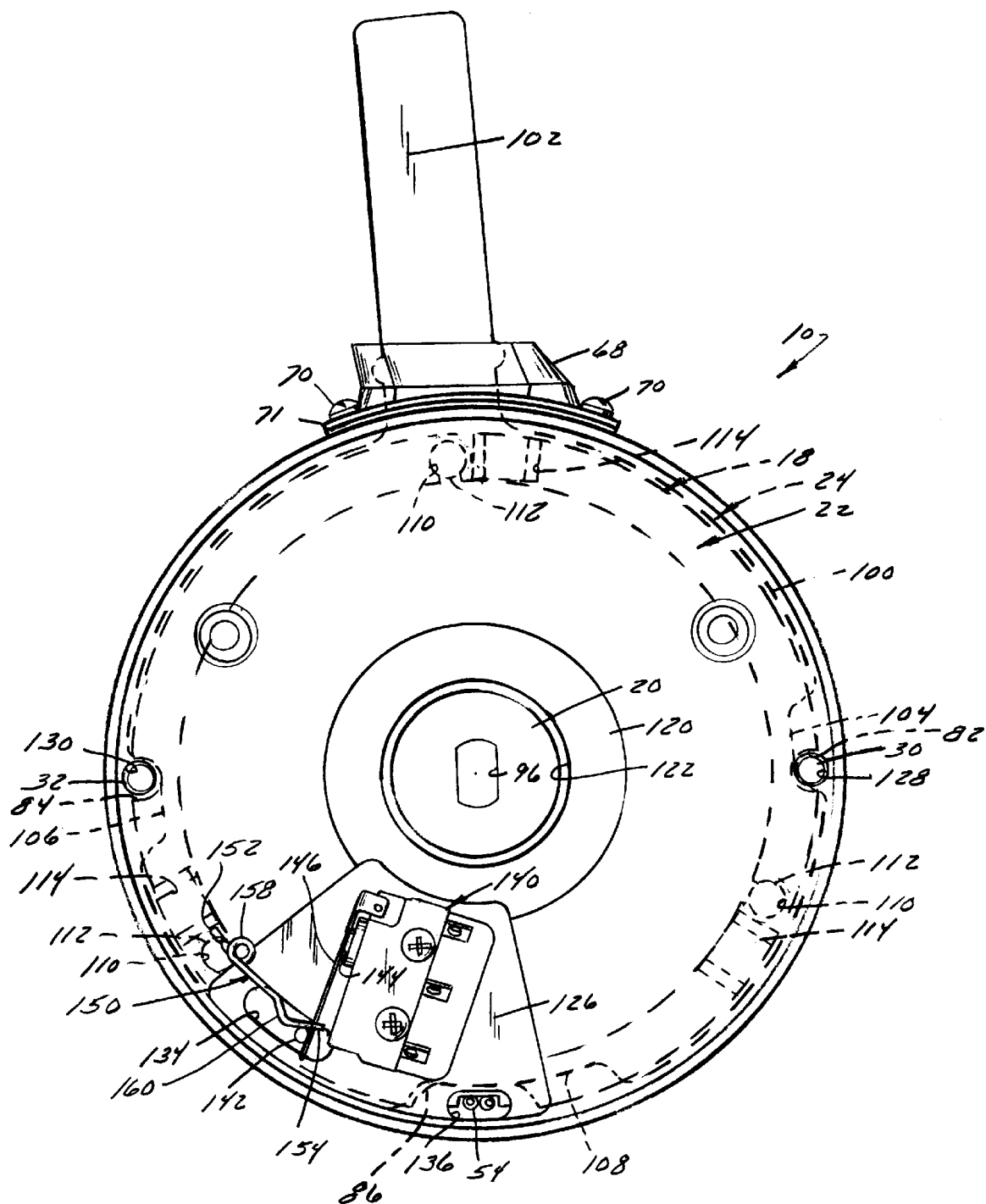
FIG. 6 corresponds to FIG. 5 but illustrates the brake in a manually-released position thereof.

Referring to FIGS. 4–6, the switch 140 is designed to provide an electronic indication of the manual actuation of the release lever 24. The switch 140 includes 1) a roll pin 142 extending axially outwardly from the disk 100 of the manual release lever 24, and 2) a contact assembly mounted in the recess 126 in the outer axial surface 124 of the endbell 22. The roll pin 142 extends through and beyond the arcuate slot 134 in the endbell 22 so that the roll pin 142 moves arcuately relative to the endbell 22 upon release lever actuation. The contact assembly includes 1) a plunger 144, and 2) a pivoting arm 146 that is contacted by the roll pin 142 when the release lever 24 moves from its de-actuated position illustrated in FIG. 5 to its actuated position in FIG. 6 to close the switch 140.

An anti-rattle spring 150 is mounted in the recess 126 of the endbell 22 in contact with the roll pin 142. The spring 150 comprises a spring wire that has 1) a first end 152 staked or otherwise affixed to the outer axial surface 124 of the endbell 22 and 2) a second, free end disposed beyond the roll pin 142. A knee 156 is formed between the first and second ends 152 and 154 to divide the spring 150 into an inner portion and an outer portion. The inner portion includes a coil 158 located adjacent the first end 152 and also includes an angled or ramped portion 160 located adjacent the knee 156.

In use, the ramped portion 160 of the spring 150 engages the roll pin 142 when the release lever 24 is in its deactuated position illustrated in FIG. 5 to prevent the roll pin 142 and, hence, the entire manual release lever 24, from moving in the absence of manual actuation forces, thereby preventing the release lever 24 from rattling or from inadvertently closing the switch 140. When the operator rotates the handle 102 from the position illustrated in FIG. 5 to the position illustrated in FIG. 6, the consequent release lever rotation is resisted by the spring 150 as the roll pin 142 rides up the ramped portion 160 of the spring 150 and deflects the spring 150. However, once the roll pin 142 clears the knee 156, it rides down an opposed ramp 161 on the outer end portion of the spring 150 that presents little or no resistance to roll pin motion. As a result, the spring 150 acts as a detent, leaving the operator with a distinct feeling of release or unlatching when the roll pin 142 clears the knee 156. It also acts as a latch when the roll pin 142 clears the knee 156 upon the return stroke of the release lever 24.

4. Assembly of Electromagnetic Disc Brake

Once the components of the brake 10 are fabricated, they can be preassembled by the manufacturer so as to permit their installation on the electric motor 12 by the ultimate customer without modification to the brake 10. Specifically, the mounting holes in the field cup 40 and endbell 22 are aligned with one another and with the double-D shaped aperture 96 in the friction disk 20 so as to be compatible with the associated motor design. The brake 10 can be assembled using fixtures seen in FIGS. 7, 8, and 9.

First, referring to FIGS. 7 and 8, the endbell 22 and field cup 40 are press-fit together using first and second press fixtures 170 and 172. The first press-fit fixture 170 includes an internal cup 174 and posts 176 and 178. The cup 174 receives the field cup 40, the clapper plate 18, and the friction disk 20 in a stacked relationship. The posts 176 and 178 extend axially outwardly from the cup 174 at a spacing which matches the spacing of the threaded bores of the associated motor 12 that are designed to mate with the mounting bolts of a stock endbell. The second press-fit fixture 172 includes an inner face 180 designed to receive the outer axial face of the endbell. Recesses 182 and 184 are formed in the inner face 180 to receive the ends of the posts 176 and 178.

In use, the field cup 40, spring 58, clapper plate 18, and friction disk 20 are stacked in the cup 174 of the first press-fit fixture 170, with the holes 62 and 64 in the field cup 40, the scallops 82 and 84 in the clapper plate 18, and the scallops 104 and 106 in the release lever 24 being aligned with the posts 176 and 178. The holes 128 and 130 of endbell 22 are then slid over the posts 176 and 178 on the first press-fit fixture 170. The second fixture 172 is then driven from the position illustrated in FIG. 7 to the position illustrated in FIG. 8 to press-fit the skirt 48 on the field cup 40 onto the step 72 of the endbell 22. During this movement, engagement between the posts 176 and 178 with the holes 62 and 64 in the field cup and the holes 128 and 130 in the endbell 22 maintains the proper alignment of the endbell 22 relative to the field cup 40.

Figure 9:
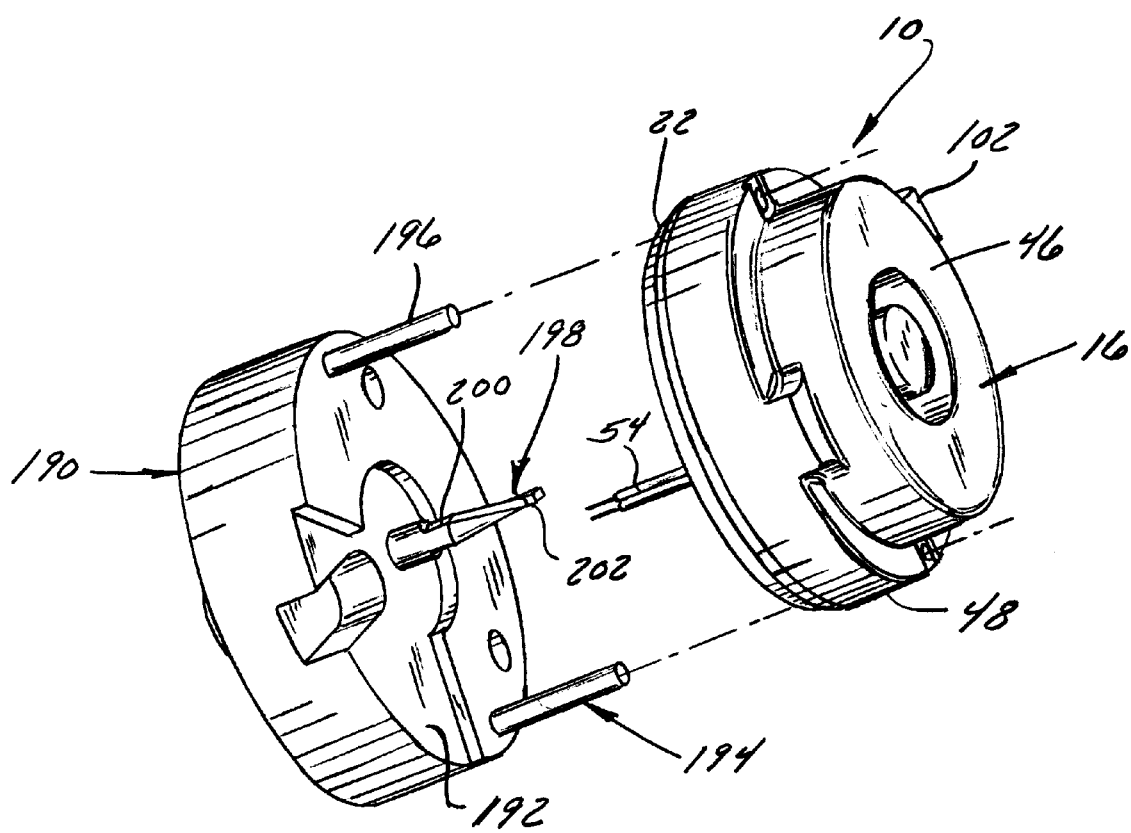
FIG. 9 is a perspective view of a fixture for aligning mounting holes in the endbell and field cup of the brake with a central aperture in the brake's friction disk.

Next, the central double-D shaped aperture 96 in the friction disk 20 is aligned with the mounting holes 62, 64, 130, 132 using the fixture 190 illustrated in FIG. 9. This fixture 190 includes 1) a mounting surface 192 for engagement with the inner surface 74 of the endbell 22 and 2) first, second, and third posts 194, 196, and 198 extending axially away from the mounting surface 192. The locations of the first and second posts 194 and 196 are identical to the locations of the mounting posts 176 and 178 of the bottom press-fit fixture 170 of FIGS. 7 and 8. The center mounting post 198 has a double-D shaped base 200 and an end portion 202 that is similar in shape to the base 200 but twisted 90° from inner to outer ends thereof.

When the brake 10 is pressed onto the friction disk alignment fixture 190 with the posts 194 and 196 extending through the mounting holes 62, 64, 130, and 132, the aperture 96 in the friction disk 20 rides along the center post 198. When the brake 10 is fully inserted into the posts 194, 196, and 198 so as to rest flush against the mounting surface 192 of the alignment fixture 190, the aperture 96 of the friction disk 20 rests on the base 200 of the post 198 and is axially aligned with the axis of the brake 10. The brake 10 is now ready for mounting on the electric motor 12 without any modifications to the brake.

5. Operation of Electromagnetic Disk Brake

In use, whenever the coil 44 is not energized, the spring 58 forces the clapper plate 18 away from the field cup 40 to compress the friction rings 92 and 94 of the friction disk 20 between the inner axial surface of the clapper plate 18 and the outer axial surface 74 of the endbell 22 as seen in FIG. 2, thereby applying the brake 10 and preventing the shaft 14 from rotating. To release the brake 10 electrically, the coil 44 is energized to pull the clapper plate 18 axially away from the friction disk 20 to a position in which the clapper plate 18 abuts the field cup 40 as seen in FIG. 3. The friction disk 20 is now free to rotate with the shaft 14 without interference from either the clapper plate 18 or the reaction plate 22.

To manually release the brake 10 manually, the operator rotates the handle 102 of the manual release lever 24, in the direction of the arrow 204 in FIG. 5, from the position illustrated in FIG. 5 to the position illustrated in FIG. 6, thereby causing the balls 112 to ride up the surfaces of the detents 114 in the clapper plate 18 and forcing the clapper plate 18 away from the friction disk 20 and releasing the brake 10. During this motion, the roll pin 142 moves, against the resistance from the spring 150, 1) from the position illustrated in FIG. 5 in which the manual release lever 24 is latched from rattling by the spring 150, 2) along the ramped surface 160 leading to the knee 156 of the spring 150, and then 3) past the knee of the spring 150 and to the position illustrated in FIG. 6. As the release lever 24 approaches the position illustrated in FIG. 6, the roll pin 142 forces the arm 146 against the plunger 144 to close the switch and generate a signal indicative of manual brake release. As discussed above, roll pin movement past the knee 156 of the spring 150 provides the operator with a noticeable unlatching feel.

It can thus be seen that a brake according to a preferred embodiment of the present invention, such as the brake 10, has many advantages. It is easy to fabricate and to install and also has fewer parts than standard electromagnetic disk brakes. The low quantity of component parts and the press-fit design renders the brake well-suited for automated assembly, further reducing the cost of the brake 10 while reducing assembly labor. In addition, due to the locations of the various scallops and other structures, the brake 10 can be assembled only one way with respect to the intended rotational orientation of the rotating parts. This reduces the chance of the brake being assembled incorrectly. The pre-assembled brake 10 is also relatively easy to mount on the motor 12 by the customer. In fact, the customer can attach the entire brake 10 to the motor 12 simply by inserting two bolts 30 and 32 through the brake 10 and attaching it to the motor 12. Finally, better concentricity of the brake 10 relative to the motor 12 is achieved due to the fact that the brake is, in effect, integral with the motor 12.

Many changes and modifications may be made to the present invention without departing from the spirit thereof. The scope of some of these changes, such as the applicability of the invention to multiple disk-brakes and to a variety of brakes other than a static, park-and-hold brake, are discussed above. The scope of other changes will become apparent below from the appended claims.

We claim:

1. An electromagnetic brake for braking a shaft which is rotatable about an axis of rotation, said brake comprising:
   (A) a friction disk which is attachable to the shaft so as to rotate about the axis of rotation of the shaft and to move axially relative to the axis of rotation of the shaft, said friction disk having first and second axially opposed friction surfaces;
   (B) a stationary reaction plate which is axially aligned with said friction disk;
   (C) a clapper plate which (1) is fixed from rotation with respect to the axis, and (2) is movable axially between (a) a first, unactuated position in which said brake is not applied and (b) a second, actuated position in which said friction disk is clamped between said clapper plate and said reaction plate to apply said brake; and
   (D) a field cup assembly including
      (1) a coil which is selectively energizeable to drive said clapper plate to move from one of said first and second positions to the other of said first and second positions, and
      (2) a field cup including (a) an axially-outer body which houses said coil, and (b) a skirt which extends from said body, over said clapper plate and said friction disk, and to said reaction plate, said skirt being attached to said reaction plate so as to encase said clapper plate, said friction disk, and at least an inner axial surface of said reaction plate.

2. A brake as defined in claim 1, wherein said reaction plate comprises an electric motor endbell.

3. A brake as defined in claim 2, further comprising bolts which extend through said field cup and said endbell and which are configured to attach said endbell to an electric motor, wherein said bolts extend through scallops in said clapper plate and prevent clapper plate rotation.

4. A brake as defined in claim 1, wherein said skirt of said field cup is press-fit onto said reaction plate.

5. A brake as defined in claim 4, wherein said brake lacks stand-offs, and wherein an air gap of said brake is set by setting a distance through which said skirt is press-fit onto said reaction plate.

6. A brake as defined in claim 4, further comprising a seal disposed between said skirt and a surface of said reaction plate, said seal comprising one of an O-ring and a gasket.

7. A brake as defined in claim 1, wherein
   said brake is a static brake which selectively prevents rotation of the shaft when the shaft is stationary, wherein
   said coil drives said clapper plate to move from said second position to said first position, and wherein
   said brake further comprises a compression spring which, in the absence of coil energization, forces said clapper plate into said second position to apply said brake, said compression spring being at least generally coaxial with the axis of the shaft rotation and forming the sole applicator spring for said brake.

8. A brake as defined in claim 1, wherein said friction disk comprises (1) a rigid backing plate which has first and second opposed axial surfaces and (2) first and second friction rings attached to said first and second axial surfaces of said backing plate, wherein said backing plate is a hubless plate having a non-circular bore formed therein which is configured for attachment to a corresponding non-circular portion of the shaft.

9. A brake as defined in claim 1, further comprising a manual release lever including (1) a release disk disposed axially between said clapper plate and said reaction plate and radially outwardly of said friction disk, and (2) a handle which is attached to said release disk and which extends radially outwardly through an aperture in said skirt, wherein said manual release lever is operable, upon manual rotation of said handle, to force said clapper plate from said second position to said first position.

10. A brake as defined in claim 9, further comprising (1) a roll pin which is affixed to said release disk and which extends axially through said reaction plate, and (2) an anti-rattle spring which is mounted on an inner axial surface of said reaction plate and which engages said roll pin so as to resist unintentional rotation of said manual release lever.

11. A brake as defined in claim 10, wherein said anti-rattle spring comprises a spring wire having a first end affixed to said reaction plate, a free second end, and a knee separating said first and second ends to divide said spring wire into an inner end portion and an outer end portion, and wherein, upon manual release lever actuation, said roll pin rides along said inner end portion, over said knee, and then down said outer end portion.

12. An electromagnetic brake for braking a shaft which is rotatable about an axis of rotation, said brake comprising:
(A) a friction disk which is attachable to the shaft so as to rotate about the axis of rotation of the shaft and to move axially relative to the axis of rotation of the shaft, said friction disk having first and second axially opposed friction surfaces;
(B) a stationary reaction plate which is axially aligned with said friction disk, an outer periphery of an outer axial surface of said reaction plate having a step formed therein;
(C) a clapper plate which (1) is fixed from rotation with respect to the axis, and (2) is movable axially between (a) a first, unactuated position in which said brake is not applied and (b) a second, actuated position in which said friction disk is clamped between and engages said clapper plate and said reaction plate to apply said brake;
(D) a field cup assembly including
  (1) a coil which is selectively energizeable to drive said clapper plate to move from one of said first and second positions to the other of said first and second positions, and
  (2) a field cup including (a) an axially-outer body which houses said coil, and (b) a skirt which extends axially inwardly from said body, over said clapper plate and said friction disk, and to said reaction plate, said skirt being press-fit onto said step of said reaction plate so as to encase said clapper plate, said friction disk, and at least said inner axial surface of said reaction plate.

13. A brake as defined in claim 12, further comprising
(A) a manual release lever including (1) a release disk disposed axially between said clapper plate and said reaction plate and radially outwardly of said friction disk, and (2) a handle which is attached to said release disk and which extends radially outwardly through an aperture in said skirt, wherein said manual release lever is operable, upon manual rotation of said handle, to force said clapper plate from said second position to said first position; and (B) an indicator switch/latch assembly which is closed upon manual actuation of said manual release lever, said assembly including (1) a roll pin which is affixed to said release disk and which extends axially through said reaction plate, (2) a switch arm which is supported on an inner axial surface of said reaction plate and which engages said roll pin upon actuation of said manual release lever, and (3) an anti-rattle spring which is mounted on said inner axial surface of said reaction plate and which engages said roll pin so as to resist unintentional rotation of said manual release lever.

14. A brake as defined in claim 13, wherein said anti-rattle spring comprises a spring wire having a first end affixed to said reaction plate, a free second end, and a knee separating said first and second ends to divide said spring wire into an inner end portion and an outer end portion, and wherein, upon manual release lever actuation, said roll pin rides along said inner end portion, over said knee, and then down said outer end portion.

15. An electromagnetic park-and-hold disk brake for a rotatable output shaft of an electric motor, said brake comprising:
(A) a stationary endbell which is configured to cover an opening in the motor, an outer periphery of an outer axial surface of said endbell having a step formed therein;
(B) a friction disk which is attachable to the shaft so as to rotate about the axis of rotation of the shaft and to move axially relative to the axis of rotation of the shaft, said friction disk having first and second axially opposed friction surfaces;
(C) a clapper plate which (a) has a plurality of scallops formed in an outer radial periphery thereof, and (b) is movable axially between (i) a first, unactuated position in which said brake is not applied and (ii) a second, actuated position in which said friction disk is clamped between and engages said clapper plate and said endbell to apply said brake;
(D) a field cup assembly including
  (1) a coil which is selectively energizeable to drive said clapper plate to move from said second position to said first position to release said brake, and
  (2) a field cup including a) an axially-outer body which houses said coil, said field cup including a sealed axially-outer surface, b) a sealed radially-outer surface, and c) an inner axial surface having formed therein (i) an annular groove in which said coil is mounted and (ii) an axially-central recess, and (iii) a sealed skirt which extends axially inwardly from said body, over said clapper plate and said friction disk, and to said endbell, a stepped inner axial end of said skirt being press-fit onto said step of said endbell so as to sealingly encase said clapper plate, said friction disk, and at least said inner axial surface of said endbell;
(E) a gasket clamped axially between said inner axial end of said skirt and an axial face of said step;
(F) a compression spring which is disposed in said recess in said field cup and which biases said clapper plate towards said second position, said compression spring being the sole applicator spring of said brake; and
(G) a plurality of bolts which extend through holes in an outer axial end of said field cup, through said scallops in said clapper plate, through holes in said endbell, and into a support of said motor, wherein
  said bolts prevent rotation of said clapper plate, and said brake lacks stand-offs, and wherein an air gap of said brake is set by setting a distance through which said skirt is press-fit onto said step.

16. An electromagnetic brake for braking a shaft of an electric motor, the shaft being rotatable about an axis of rotation, said brake comprising:
   (A) a friction disk which is attachable to the shaft so as to rotate about the axis of rotation of the shaft and to move axially relative to the axis of rotation of the shaft, said friction disk having first and second axially opposed friction surfaces;
   (B) an electric motor endbell which is axially aligned with said friction disk and which is configured to cover an opening in an axial end of the electric motor;
   (C) a clapper plate which (1) is fixed from rotation with respect to the axis, and (2) is movable axially between (a) a first, unactuated position in which said brake is not applied and (b) a second, actuated position in which said friction disk is clamped between said clapper plate and said endbell to apply said brake;
   (D) a coil which is selectively energizeable to drive said clapper plate to move from one of said first and second positions to the other of said first and second positions; and
   (E) a field cup assembly including
      (1) said coil, and
      (2) a field cup including (a) an axially-outer body which houses said coil, and (b) a skirt which extends axially inwardly from said body, over said clapper plate and said friction disk, and to said endbell, said skirt being attached to said endbell so as to encase said clapper plate, said friction disk, and at least an inner axial surface of said endbell.

17. A brake as defined in claim 16, further comprising bolts which extend through said endbell and which are configured to attach said endbell to the electric motor, wherein said bolts extend through scallops in said clapper plate and prevent clapper plate rotation.

18. A method comprising
   (A) providing an electromagnetic brake comprising:
      (1) a friction disk which is attachable to the shaft so as to rotate about the axis of rotation of the shaft and to move axially relative to the axis of rotation of the shaft, said friction disk having first and second axially opposed friction surfaces;
      (2) a stationary reaction plate which is axially aligned with said friction disk;
      (3) a clapper plate which (1) is fixed from rotation with respect to the axis, and (2) is movable axially between (a) a first, unactuated position in which said brake is not applied and (b) a second, actuated position in which said friction disk is clamped between said clapper plate and said reaction plate to apply said brake; and
      (4) a field cup assembly including
         (a) a coil which is selectively energizeable to drive said clapper plate to move from one of said first and second positions to the other of said first and second positions; and
         (b) a field cup including (i) an axially-outer field cup which houses said coil, and (ii) a skirt which extends axially inwardly from said body, over said clapper plate and said friction disk, and to said endbell;
   (B) aligning mounting holes in said field cup with mounting holes in said endbell; and then
   (C) press-fitting said skirt onto said endbell so as to encase said clapper plate, said friction disk, and at least an inner axial surface of said endbell in said skirt.

19. A method as defined in claim 18, wherein the aligning and press-fitting steps comprises
   (A) locating said field cup assembly in a first portion of a press fixture having a plurality of posts that extend through said holes in said field cup;
   (B) placing said clapper plate and said friction disk on said field cup;
   (C) sliding said holes in said endbell over said post; and
   (D) driving a second portion of said press fixture toward said first portion so as to press said skirt onto said endbell.

20. A method as defined in claim 19 further comprising, following the pressing step, aligning a non-circular shaft mounting hole in said friction disk with said holes in said field cup and said endbell by pressing said brake onto a fixture assembly having (1) spaced posts aligned with said holes in said field cup and said endbell, and (2) an axially-central post having a non-circular shape when viewed in transverse cross-section.

* * * * *